US007995757B2

(12) United States Patent
Michaels et al.

(10) Patent No.: US 7,995,757 B2
(45) Date of Patent: Aug. 9, 2011

(54) CLOSED GALOIS FIELD COMBINATION

(75) Inventors: Alan J. Michaels, West Melbourne, FL (US); David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 1104 days.

(21) Appl. No.: 11/756,086

(22) Filed: May 31, 2007

(65) Prior Publication Data

US 2009/0044080 A1    Feb. 12, 2009

(51) Int. Cl.
*H04K 1/00*    (2006.01)
*G06F 7/58*    (2006.01)

(52) U.S. Cl. .................... 380/255; 380/268; 708/250
(58) Field of Classification Search .................... None
See application file for complete search history.

(56) References Cited

U.S. PATENT DOCUMENTS

| | | | |
|---|---|---|---|
| 3,564,223 A | 2/1971 | Harris et al. | |
| 3,780,275 A * | 12/1973 | Nakamura | 708/250 |
| 4,646,326 A | 2/1987 | Backof, Jr. et al. | |
| 4,703,507 A | 10/1987 | Holden | |
| 5,007,087 A | 4/1991 | Bernstein et al. | |
| 5,048,086 A | 9/1991 | Bianco et al. | |
| 5,077,793 A | 12/1991 | Falk et al. | |
| 5,276,633 A | 1/1994 | Fox et al. | |
| 5,297,153 A | 3/1994 | Baggen et al. | |
| 5,297,206 A | 3/1994 | Orton | |
| 5,319,735 A | 6/1994 | Preuss et al. | |
| 5,412,687 A | 5/1995 | Sutton et al. | |
| 5,598,476 A | 1/1997 | LaBarre et al. | |
| 5,757,923 A | 5/1998 | Koopman, Jr. | |
| 5,811,998 A | 9/1998 | Lundberg et al. | |
| 5,852,630 A | 12/1998 | Langberg et al. | |
| 5,900,835 A | 5/1999 | Stein | |

(Continued)

FOREIGN PATENT DOCUMENTS

EP    0 849 664 A2    6/1998

(Continued)

OTHER PUBLICATIONS

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

(Continued)

*Primary Examiner* — Kambiz Zand
*Assistant Examiner* — Imhotep Durham
(74) *Attorney, Agent, or Firm* — Fox Rothschild, LLP; Robert J. Sacco

(57) ABSTRACT

A method is provided for combining two or more input sequences in a communications system to increase a repetition period of the input sequences in a resource-efficient manner. The method includes a receiving step, a mapping step, and a generating step. The receiving step involves receiving a first number sequence and a second number sequence, each expressed in a Galois field $GF[p^k]$. The mapping step involves mapping the first and second number sequences to a Galois extension field $GF[p^{k+1}]$. The generating step involves generating an output sequence by combining the first number sequence with the second number sequence utilizing a Galois field multiplication operation in the Galois extension field $GF[p^{k+1}]$. p is a prime number. k is an integer. $p^{k+1}$ defines a finite field size of the Galois extension field $GF[p^{k+1}]$.

20 Claims, 5 Drawing Sheets

U.S. PATENT DOCUMENTS

| | | | |
|---|---|---|---|
| 5,924,980 | A | 7/1999 | Coetzee |
| 5,937,000 | A | 8/1999 | Lee et al. |
| 6,014,446 | A | 1/2000 | Finkelstein |
| 6,023,612 | A | 2/2000 | Harris et al. |
| 6,038,317 | A | 3/2000 | Magliveras et al. |
| 6,078,611 | A | 6/2000 | La Rosa et al. |
| 6,304,216 | B1 | 10/2001 | Gronemeyer |
| 6,331,974 | B1 | 12/2001 | Yang et al. |
| 6,377,782 | B1 | 4/2002 | Bishop et al. |
| 6,570,909 | B1 | 5/2003 | Kansakoski et al. |
| 6,614,914 | B1 | 9/2003 | Rhoads et al. |
| 6,744,893 | B1 | 6/2004 | Fleming-Dahl |
| 6,754,251 | B1 | 6/2004 | Sriram et al. |
| 6,766,345 | B2 * | 7/2004 | Stein et al. .................... 708/492 |
| 6,842,479 | B2 | 1/2005 | Bottomley |
| 6,980,656 | B1 | 12/2005 | Hinton, Sr. et al. |
| 6,986,054 | B2 | 1/2006 | Kaminaga et al. |
| 7,023,323 | B1 | 4/2006 | Nysen |
| 7,027,598 | B1 | 4/2006 | Stojancic et al. |
| 7,069,492 | B2 | 6/2006 | Piret et al. |
| 7,076,065 | B2 | 7/2006 | Sherman et al. |
| 7,078,981 | B2 | 7/2006 | Farag |
| 7,079,651 | B2 | 7/2006 | Den Boer |
| 7,095,778 | B2 | 8/2006 | Okubo et al. |
| 7,133,522 | B2 | 11/2006 | Lambert |
| 7,170,997 | B2 | 1/2007 | Petersen et al. |
| 7,190,681 | B1 | 3/2007 | Wu |
| 7,200,225 | B1 | 4/2007 | Schroeppel |
| 7,233,969 | B2 | 6/2007 | Rawlins et al. |
| 7,233,970 | B2 | 6/2007 | North et al. |
| 7,245,723 | B2 | 7/2007 | Hinton, Sr. et al. |
| 7,269,198 | B1 | 9/2007 | Elliott et al. |
| 7,269,258 | B2 | 9/2007 | Ishihara et al. |
| 7,272,168 | B2 | 9/2007 | Akopian |
| 7,277,540 | B1 | 10/2007 | Shiba et al. |
| 7,529,292 | B2 | 5/2009 | Bultan et al. |
| 7,643,537 | B1 | 1/2010 | Giallorenzi et al. |
| 7,779,060 | B2 | 8/2010 | Kocarev et al. |
| 7,830,214 | B2 | 11/2010 | Han et al. |
| 7,853,014 | B2 | 12/2010 | Blakley et al. |
| 2002/0099746 | A1 | 7/2002 | Tie et al. |
| 2003/0044004 | A1 | 3/2003 | Blakley et al. |
| 2004/0001556 | A1 | 1/2004 | Harrison et al. |
| 2004/0059767 | A1 | 3/2004 | Liardet |
| 2004/0196212 | A1 | 10/2004 | Shimizu |
| 2005/0031120 | A1 | 2/2005 | Samid |
| 2005/0050121 | A1 | 3/2005 | Klein et al. |
| 2005/0089169 | A1 | 4/2005 | Kim et al. |
| 2005/0207574 | A1 | 9/2005 | Pitz et al. |
| 2005/0274807 | A1 | 12/2005 | Barrus et al. |
| 2006/0072754 | A1 | 4/2006 | Hinton et al. |
| 2006/0123325 | A1 | 6/2006 | Wilson et al. |
| 2006/0209932 | A1 | 9/2006 | Khandekar et al. |
| 2006/0251250 | A1 | 11/2006 | Ruggiero et al. |
| 2007/0121945 | A1 | 5/2007 | Han et al. |
| 2007/0230701 | A1 | 10/2007 | Park et al. |
| 2008/0008320 | A1 | 1/2008 | Hinton et al. |
| 2008/0016431 | A1 | 1/2008 | Lablans |
| 2008/0095215 | A1 | 4/2008 | McDermott et al. |
| 2008/0198832 | A1 | 8/2008 | Chester |
| 2008/0263119 | A1 | 10/2008 | Chester et al. |
| 2008/0294710 | A1 | 11/2008 | Michaels |
| 2008/0294956 | A1 | 11/2008 | Chester et al. |
| 2008/0304553 | A1 | 12/2008 | Zhao et al. |
| 2008/0304666 | A1 | 12/2008 | Chester et al. |
| 2008/0307022 | A1 | 12/2008 | Michaels et al. |
| 2008/0307024 | A1 | 12/2008 | Michaels et al. |
| 2009/0034727 | A1 | 2/2009 | Chester et al. |
| 2009/0044080 | A1 | 2/2009 | Michaels et al. |
| 2009/0110197 | A1 | 4/2009 | Michaels |
| 2009/0122926 | A1 | 5/2009 | Azenkot et al. |
| 2009/0196420 | A1 | 8/2009 | Chester et al. |
| 2009/0202067 | A1 | 8/2009 | Michaels et al. |
| 2009/0245327 | A1 | 10/2009 | Michaels |
| 2009/0279688 | A1 | 11/2009 | Michaels et al. |
| 2009/0279690 | A1 | 11/2009 | Michaels et al. |
| 2009/0296860 | A1 | 12/2009 | Chester et al. |
| 2009/0300088 | A1 | 12/2009 | Michaels et al. |
| 2009/0309984 | A1 | 12/2009 | Bourgain et al. |
| 2009/0310650 | A1 | 12/2009 | Chester et al. |
| 2009/0323766 | A1 | 12/2009 | Wang et al. |
| 2009/0327387 | A1 | 12/2009 | Michaels et al. |
| 2010/0111296 | A1 | 5/2010 | Brown et al. |

FOREIGN PATENT DOCUMENTS

| | | |
|---|---|---|
| EP | 0 949 563 | 10/1999 |
| EP | 2 000 900 | 12/2008 |
| EP | 2 000 902 A2 | 12/2008 |
| GB | 1167272 A | 10/1969 |
| WO | WO-0135572 A2 | 5/2001 |
| WO | WO-2006 110954 | 10/2006 |
| WO | WO 2008 65191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.

Manikandan, et al, "A Novel Pulse Based Ultrawide Band System Using Chaotic Spreading Sequences" Communication Systems Software and Middleware, 2007. COMSWARE 2007. 2nd International Conference on, IEEE, PI, Jan. 1, 2007, pp. 1-5, XP031113946 ISBN: 978-1-4244-0613-5; p. 1, page 5.

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Barile, Margherita. "Bijective." From MathWorld—A Wolfram Web Resource, created by Eric W. Weisstein. http://mathworld.wolfram.com/Bijective.html.

Weisstein, Eric W. "Injection." From Mathworld—A Wolfram Web Resource. http://mathworld.wolfram.com/Injection.html.

Weisstein, Eric W. "Surjection." From Mathworld—A Wolfram Web Resource. http://mathworld.wolfram.com/Surjection.html.

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Kolumban, et al., "Chaotic Communications with Correlator Receivers: Theory and Performance Limits" Proceedings of the IEEE, vol. 90, No. 5, May 2002.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].

Morsche, et al., "Signals and Systems," lecture notes, University of Eindhoven, The Netherlands, 1999.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Yen, et al., (1999) "Residual Number System Assisted CDMA: A New System Concept", In: ACTS'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

Michaels, et al., U.S. Appl. No. 12/056,024, filed Mar. 26, 2008, entitled "Selective Noise Cancellation of a Spread Spectrum Signal".

Michaels, et al., U.S. Appl. No. 12/117,086, filed May 8, 2008, Entitled "Cryptographic System Including a Mixed Radix Number Generator With Chosen Statistical Artifacts".

Chester, et al., U.S. Appl. No. 12/116,104, filed May 6, 2008, Entitled, "A Closed Galois Field Cryptographic System".

Chester, et al., U.S. Appl. No. 12/131,386, filed Jun. 2, 2008, Entitled "Adaptive Correlation".

Chester, et al., U.S. Appl. No. 12/137,593, filed Jun. 12, 2008, entitled "Featureless Coherent Chaotic Amplitude Modulation".

Michaels, et al., U.S. Appl. No. 12/129,197, filed May 29, 2008, entitled "Digital Generation of an Accelerated or Decelerated Chaotic Numerical Sequence".

Michaels, et al., U.S. Appl. No. 12/129,654, filed May 29, 2008, entitled "Sine/Cosine Generator".

Michaels, et al., U.S. Appl. No. 12/496,214, filed Jul. 1, 2009, entitled "Anti-Jam Communications Having Selectively Variable Papr Including Cazac Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "AD-HOC Network Acquisition Using Chaotic Sequence Spread Waveform".

Michaels, Alan, U.S. Appl. No. 12/201,021, filed Aug. 29, 2008, entitled, "Multi-Tier AD-HOC Network Communications".

Aparicio; "Communications Systems Based on Chaos" May 2007. Universidad Rey Juan Carlos.

Bererber, S.M., et al., "Design of a CDMA Sysetm in FPGA Technology", Vehicular Technology Conference, 2007. VTC2007-Spring. IEEE 65TH Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp._ 1-1__1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON 2002 Oct. 2, 2002, Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld-A Wolfram Web Resource, created by Eric W. Weisstein, [online] [retrieved on Nov. 8, 2010] Retrieved from the Internet: <http://mathworld.wolfram.com/Bijective.html>.

Weisstein, E., Surejection:, From MathWorld-A Wolfram Web Resource [online] [retrieved on Nov. 8, 2010] Retrieved from the Internet: <http://mathworld.wolfram.com/surjection.html>.

Weisstein, E., Surejection:, From MathWorld-A Wolfram Web Resource [online] [retrieved on Nov. 8, 2010] Retrieved from the Internet: http://mathworld.wolfram.com/injection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

Taylor, F.J., "Residue Arithmetic A Tutorial with Examples", Computer, vol. 17, No. 5, pp. 50-62, May 1984, doi: 10.1109/MC. 1984. 1659138.

* cited by examiner

CLOSED GALOIS FIELD COMBINATION

BACKGROUND OF THE INVENTION

1. Statement of the Technical Field

The inventive arrangements relate to efficient implementations of Galois field multiplication in signal processing, error correction codes, pseudo-random number generation, and encryption systems. More particularly, the inventive arrangements relate to an efficient and invertible closed Galois field combination (CGFC) process for combining two or more input sequences.

2. Description of the Related Art

Sequence generators are used in applications ranging from signal processing, error correction codes, pseudo-random number generation, and encryption systems. The underlying mechanism in each of these applications is a sequence that is finite in nature, with the smaller the repetition period of the sequence, the easier it is for an outsider to determine or predict the future values of the sequence. To increase the repetition period of a sequence, most applications increase the length of the generating polynomial, use some type of nonlinear combination technique with multiple orthogonal sequences, or otherwise increase the length of the sequence.

These techniques result in significantly increasing implementation complexity, which translates into increased resource consumption and processing time. Also, for each sequence period, the generating algorithm is typically fixed and tied to a specific irreducible polynomial over a Galois field. It is also desirable to implement combination techniques such that a priori knowledge of one or more of the input sequences yields an efficient method to defect and correct sequence errors that may occur during storage or transmission.

Static examples of modification of a number sequence exist in communication systems. One such example is the Reed Solomon error correction code and derivatives thereof. The Reed Solomon error correction code computes an output value based on Galois extension field multiplications using a primitive element and a fixed irreducible polynomial.

In view of the forgoing, there remains a need for a method to combine a data stream with a random number sequence that is more computationally efficient than conventional methods. There also remains a need for a method to efficiently increase the repetition period of a random number sequence. There further remains a need for a method to combine a data stream with a random number sequence that is less error-prone than conventional methods.

SUMMARY OF THE INVENTION

The invention concerns a method for combining at least two input sequences in a communications system to increase a repetition period of the input sequences in a resource-efficient manner. The method includes a receiving step, a mapping step, and a generating step. The receiving step involves receiving a first number sequence and a second number sequence. The first and second number sequences are expressed in a Galois field $GF[p^k]$. The mapping step involves mapping the first and second number sequences to a Galois extension field $GF[p^{k+1}]$. The generating step involves generating an output sequence by combining the first number sequence with the second number sequence utilizing a Galois field multiplication operation in the Galois extension field $GF[p^{k+1}]$. p is a prime number. k is an integer. $p^{k+1}$ defines a finite field size of the Galois extension field $GF[p^{k+1}]$. It should be noted that the generating step is performed to guarantee invertible reconstruction of the first, and second number sequences.

According to an aspect of the invention, the method includes selecting $p^k$ to be a prime number defining a finite field size of the Galois field $GF[p^k]$. The method can also include expressing the first and second number sequences in a p-adic number system representation or a mixed radix number system representation prior to the receiving step.

According to another aspect of the invention, each of the first and second number sequences is comprised of two or more digits expressed in a weighted number system. The method includes combining the first and second number sequences by selectively performing Galois field multiplication operations using a distinct subset of digits from each of the first and second number sequences.

According to another aspect of the invention, the method includes selecting the first number sequence to be payload data or a random number sequence. The method also includes selecting the second number sequence to be a pseudo random number sequence or a pseudo-chaotic random number sequence. The method includes selecting one or more input sequences to be random number sequences having a known mathematical relationship and combining the same with the first number sequence.

According to yet another aspect of the invention, the mapping step includes performing an Affine transformation of the first and second number sequences. The method also includes selecting the Affine transformation to be a function of time.

A closed Galois field cryptographic (CGFC) system is also provided. The CGFC system is comprised of a receiving means, a mapping means, and a generating means. The receiving means is configured to receive a first number sequence and a second number sequence. The first number sequence and the second number sequence are expressed in a Galois field $GF[p^k]$. The mapping means is configured for mapping the first and second number sequences to a Galois extension field $GF[p^{k+1}]$. The generating means is configured to generate an output sequence by combining the first number sequence with the second number sequence utilizing a Galois field multiplication operation in the Galois extension field $GF[p^{k+1}]$. p is a prime number. k is an integer. $p^{k+1}$ defines a finite field size of the Galois extension field $GF[p^{k+1}]$.

According to an aspect of the invention. $p^k$ is a prime number defining a finite field size of the Galois field $GF[p^k]$. The first and second number sequences are expressed in a p-adic number system representation or a mixed-radix number system representation.

According to another aspect of the invention, each of the first and second number sequences is comprised of two or more digits expressed in a weighted number system. The generating means is further configured to combine the first number sequence and the second number sequence by selectively performing Galois field multiplication operations using a distinct subset of digits from each of the first and second number sequences.

According to another aspect of the invention, the first number sequence is payload data or a random number sequence. The second number sequence is a pseudo random number sequence or a pseudo-chaotic random number sequence. The generating means is further configured to combine two or more input sequences with the first number sequence. The input sequences are random number sequences having a known mathematical relationship.

According to another aspect of the invention, the mapping means is further configured to perform an Affine transformation of the first and second number sequences. The Affine transformation can be a function of time.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

In many communications system applications, it is desirable to have an efficient means of combining two or more number sequences. Such communications system applications include a random number generation application, an error coding application, an encryption application, a modulation application, and the like. In error coding and encryption applications, the combining process is performed for masking an input data stream by some invertible operation using a number stream produced to deny determination of its generating characteristics. The term "invertible" as used herein refers to the existence of a method for undoing the masking operation. It is also desirable to have an efficient means of combining two (2) independent linearly generated number streams. This combining process can provide a non-linear number stream. Non-linearly generated number streams make it very difficult to identify generating structures. As such, some embodiments of the present invention provide a method and apparatus for efficiently combining two (2) data inputs via multiplication in a Galois extension field. Such an embodiment satisfies efficiency in both time and hardware design. Such an embodiment further provides a simple nearly symmetric inverse operator.

Other embodiments of the present invention provide a method for efficiently masking data in digital hardware while making unintended decoding difficult. In this regard, it should be appreciated that such a method can be used in a variety of communications system applications. Such a method can be combined with other nonlinear processing techniques to induce chosen statistical characteristics.

Figure 1:
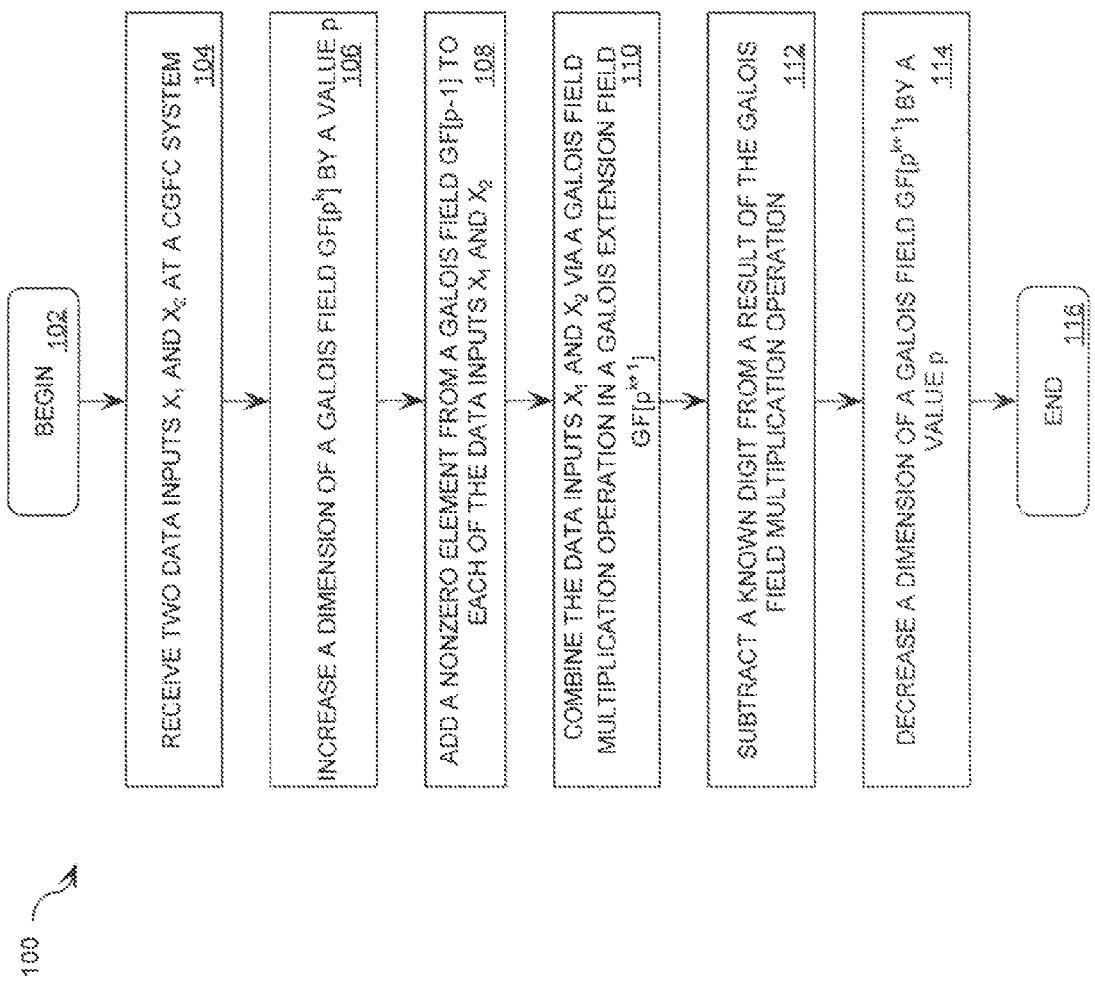
FIG. 1 is a flow chart of a closed Galois field combination (CGFC) method that is useful for understanding the invention.

Referring now to FIG. 1, there is provided a flow chart of a closed Galois field combination (CGFC) method 100 for combining two (2) data inputs. Prior to describing the CGFC method 100, a brief discussion of Galois fields is provided to assist a reader in understanding the present invention. It should be understood that the following discussion is a general discussion of the fundamental properties for a Galois field. For simplicity purposes, a complete or precise definition of a Galois field is not provided.

As should be understood, a Galois field $GF[p^k]$ is a cyclic finite structure created on a discrete collection of elements $\{0, 1, 2, \ldots, p^k-1\}$. For example, a Galois field $GF[2^3]$ is a cyclic finite structure containing elements $\{0, 1, 2, 3, 4, 5, 6, 7\}$. The Galois field $GF[p^k]$ has certain analytical properties that allow arithmetic operations to be performed within the Galois field $GF[p^k]$. Such arithmetic operations include an addition operation, a subtraction operation, and a multiplication operation. The Galois field $GF[p^k]$ is often referred to as a closed structure since results of said arithmetic operations equal another element in the same Galois field. The arithmetic operations may be viewed as modular arithmetic. For example, if the Galois field $GF[p^k]$ is selected as a Galois field $GF[7^1]$, then the modular arithmetic for selected elements can be defined as follows: $2-4=-1\cdot7+5=5 \mod 7$; $5+6=11=1\cdot7+4=4 \mod 7$; and $5\cdot6=30=4\cdot7+2=2 \mod 7$.

An arithmetic operation of division in the Galois field $GF[p^k]$ requires a definition of unique multiplicative inverses. More generally, division by a number in Galois field $GF[p^k]$ is notionally equivalent to a multiplication by said number's inverse. For example, if the Galois field $GF[p^k]$ is selected as a Galois field $GF[11]$, then the modular arithmetic for selected elements can be defined as follows: $4\cdot3=12=1 \mod 11$. In such a scenario, four (4) is the multiplicative inverse of three (3) in Galois field $GF[11]$. Similarly, three (3) is the multiplicative inverse of four (4) in Galois field $GF[11]$.

As should be understood, the arithmetic operation of division in the Galois field $GF[p^k]$ is only valid for nonzero elements in said Galois field $GF[p^k]$. For example, if the Galois field $GF[p^k]$ is selected as a Galois field $GF[2^3]$, then the modular arithmetic for elements zero and X is defined as follows: $0\cdot X=0\equiv0 \mod 8$. X is any element of Galois field $GF[2^3]$. In such a scenario, there does not exist a multiplicative inverse of zero within the Galois field $GF[2^3]$. As such, a multiplication of element zero (0) times another element of Galois field $GF[2^3]$ can not be inverted to obtain one (1) of the two (2) elements multiplied together. Notably, there also does not exist a multiplicative inverse for the even numbered elements $\{0, 2, 4, 6\}$ within the Galois field $GF[2^3]$. More generally, there does not exist a multiplicative inverse for any even numbered elements in a Galois field $GF[2^k]$. Even more generally, in a Galois field $GF[p]$ it is true that only numbers that are not divisible by the prime characteristic p will have unique inverses.

Referring again to FIG. 1, the present invention provides a CGFC method 100 for bypassing the above-described shortcomings of Galois field multiplication. The present invention also provides a CGFC method 100 which ensures that a multiplicative inverse exists for elements in a Galois field $GF[p]$. Generally, the method involves performing an Affine transformation on any plurality of k-bit data streams. The resulting data streams can be efficiently and invertibly combined by a means of Galois field multiplication in a Galois field $GF[p^{k+1}]$. The Affine transformation yields additional degrees of freedom which expands the variability of output values and thereby makes reverse engineering of the k-bit data streams more difficult. As will be appreciated by those skilled in the art, Affine transformations generally involve appending a one (1) to the end of a digital word or removing a one (1) from the end of a digital word.

The following Example is provided in order to further illustrate an Affine transformation. The scope of the present invention, however, is not to be considered limited in any way thereby.

Example 1

Let p equal two (2) and k equal three (3). A simple Affine transformation from a Galois field GF[8] to a Galois field GF[16] is performed by appending a one (1) behind a least significant bit (LSB) of each three (3) bit representation of numbers in the Galois field GF[8]. The Affine transformation yields 0→1, 1→3, 2→5, 3→7, 4→9, 5→11, 6→13, and 7→15. Each number in the extended Galois field has a unique multiplicative inverse. Explicitly, $1^{-1}$ mod 16≡1, $3^{-1}$ mod 16≡11, $5^{-1}$ mod 16≡13, $7^{-1}$ mod 16≡7, 9-1 mod 16≡9, 11-1 mod 16≡3, $13^{-1}$ mod 16≡5, and $15^{-1}$ mod 16≡15. The Affine transformation from the Galois field GF[16] to the Galois field GF[8] is performed as (y-1)/2, where y is the result of the Galois field GF[16] multiplication. The Affine transformation from the Galois field $GF[2^k]$ to the Galois field $GF[2^{k+1}]$ always yields an odd value. The result of the Galois field $GF[2^{k+1}]$ multiplication y is always odd. y-1 is always even. The Affine transformation from the Galois field $GF[2^{k+1}]$ to the Galois field $GF[2^k]$ is simply accomplished by dropping the least significant bit (LSB) from y and keeping the k most significant bits.

Referring again to FIG. 1, the CGFC method 100 begins at step 102 and continues with step 104. In step 104, two data inputs $X_1$ and $X_2$ are received at a closed Galois field combination system. The closed Galois field combination system can be, but is not limited to, a closed Galois field encryption system such as that described below in relation to FIG. 5. Thereafter, step 106 is performed where a dimension of a Galois field $GF[p^k]$ is increased by a value p. After step 106, step 108 is performed where a nonzero element from a Galois field GF[p-1] is added to each of the data inputs $X_1$ and $X_2$. It should be noted that steps 106 and 108 collectively provide an Affine transformation between an original number range to a number range of a Galois extension field. The Affine transformation can be selected as a constant function or a function of time. Affine transformations are well known to persons skilled in the art, and therefore will not be described in great detail herein. However, it should be understood that an Affine transformation may be considered a bijective mapping. Bijective, infective, and surjective mappings are also well known to persons skilled in the art, and therefore will not be described herein.

In step 110, the two data inputs are combined via a Galois field multiplication operation in a Galois extension field $GF[p^{k+1}]$. The Galois field multiplication operation is performed to guarantee invertible reconstruction of the data inputs $X_1$ and $X_2$. This invertible operation is desirable such that a first data input $X_1$ can be obtained via a predefined mathematical process and a priori knowledge of a second data input $X_2$.

After step 110, the CGFC method 100 continues with a step 112. In step 112, a known digit is subtracted from a result of said Galois field multiplication operation. In step 114, a dimension of a Galois held $GF[p^{k+1}]$ is decreased by a value p. Subsequently, step 116 is performed where the CGFC method 100 ends.

Referring to again to step 110 of FIG. 1, a brief discussion of the rationale and mechanics of multiplication in a Galois field is provided to assist a reader in understanding the present invention. It should be noted that the scope of the present invention is not to be considered limited in any way thereby.

As should be understood, multiplication of two (2) numbers in a Galois field results in another number within the same Galois field. The multiplication process may not be invertible, even given knowledge of one of the original numbers since the other number may not have a multiplicative inverse. For example, the multiplication of the numbers two (2) and four (4) in a Galois field GF[8] yields a number zero (2×4=8≡0 modulo 8). If the output value of zero (0) and an input value is known, then the other input value can not be reconstructed since the numbers two (2) or four (4) do not have a multiplicative inverse in a Galois field GP[8]. More generally, the multiplication process is non-invertible for some values in a Galois field GF[8].

The solution to guaranteed invertible multiplication is to restrict the numbers being multiplied to those which have multiplicative inverses in a given Galois field. This restriction places additional requirements on the random number generator to either produce acceptable numbers or else to map outputs to acceptable numbers. One method of implementing a structure such that all elements have unique inverses is to increase the dimension of the original Galois field, mapping the initial number set to a distinct invertible subset of the extended Galois field. The Galois field having an increased dimension is referred to herein as a Galois extension field. It can be shown that there exists an infective mapping between the elements in the original Galois field and those in the Galois extension field that possess multiplicative inverses. This invertability allows a unique multiplication of numbers in the original Galois field through the injective mapping, implementing an effective bijective mapping.

Example 2

As an example, compare the direct (non-invertible) multiplication of elements in a Galois field $GF[3^2]$ with the (invertible) multiplications of the same elements when projected upon a subset of the Galois extension field GF[33]. The elements in the Galois field $GF[3^2]$ are provided in the following Table 1. The elements in the Galois field GF[33] are provided in the following Table 2. It should be noted that the numbers in Tables 1 and 2 are represented in 2-digit 3-adic representation.

TABLE 1

BASIC TIMES TABLE FOR $3^2$, USING DIRECT MULTIPLICATION

|    | 00 | 01 | 02 | 10 | 11 | 12 | 20 | 21 | 22 |
|----|----|----|----|----|----|----|----|----|----|
| 00 | 00 | 00 | 00 | 00 | 00 | 00 | 00 | 00 | 00 |
| 01 | 00 | 01 | 02 | 10 | 11 | 12 | 20 | 21 | 22 |
| 02 | 00 | 02 | 11 | 20 | 22 | 01 | 10 | 12 | 21 |
| 10 | 00 | 10 | 20 | 00 | 10 | 20 | 00 | 10 | 20 |
| 11 | 00 | 11 | 22 | 10 | 21 | 02 | 20 | 01 | 12 |
| 12 | 00 | 12 | 01 | 20 | 02 | 21 | 10 | 22 | 11 |
| 20 | 00 | 20 | 10 | 00 | 20 | 10 | 00 | 20 | 10 |
| 21 | 00 | 21 | 12 | 10 | 01 | 22 | 20 | 11 | 02 |
| 22 | 00 | 22 | 21 | 20 | 12 | 11 | 10 | 02 | 01 |

TABLE 2

TIMES TABLE FOR $3^2$ USING GALOIS EXTENSION FIELD WITH NONZERO ELEMENTS 1

|    | 00 | 01 | 02 | 10 | 11 | 12 | 20 | 21 | 22 |
|----|----|----|----|----|----|----|----|----|----|
| 00 | 00 | 01 | 02 | 10 | 11 | 12 | 20 | 21 | 22 |
| 01 | 01 | 12 | 00 | 11 | 22 | 10 | 21 | 02 | 20 |
| 02 | 02 | 00 | 21 | 12 | 10 | 01 | 22 | 20 | 11 |

TABLE 2-continued

TIMES TABLE FOR 3² USING GALOIS EXTENSION FIELD WITH NONZERO ELEMENTS 1

|    | 00 | 01 | 02 | 10 | 11 | 12 | 20 | 21 | 22 |
|----|----|----|----|----|----|----|----|----|----|
| 10 | 10 | 11 | 12 | 20 | 21 | 22 | 00 | 01 | 02 |
| 11 | 11 | 22 | 10 | 21 | 02 | 20 | 01 | 12 | 00 |
| 12 | 12 | 10 | 01 | 22 | 20 | 11 | 02 | 00 | 21 |
| 20 | 20 | 21 | 22 | 00 | 01 | 02 | 10 | 11 | 12 |
| 21 | 21 | 02 | 20 | 01 | 12 | 00 | 11 | 22 | 10 |
| 22 | 22 | 20 | 11 | 02 | 00 | 21 | 12 | 10 | 01 |

It should be noted that the multiplication results shown in the first row and column of Table 1 are always zero (00). This result implies that the values are non-invertible. Further, the statistical distribution of the output sequence, given two uniformly random input sequences, will be skewed such that 21/81 outputs are equal to zero (00) thereby eliminating the desired uniform distributions. Table 2 displays a perfectly uniformly distributed set of outputs whenever the inputs are also uniformly distributed. Given either an input value or an output value, we can reconstruct the other input uniquely. This invertible property is most easily seen from the fact that each output value occurs only once in each row or column of Table 2.

It should be noted that Galois field multiplication is more computationally efficient than the equivalent multiplication in a weighted number system since the number of output values is restricted to a finite set. The phrase "weighted number system" as used herein refers to a number system other than a residue number system.

It should also be noted that Galois field multiplication in binary number systems such as a Galois field $GF[2^k]$ are useful in practice due to the structure of digital logic. Computational savings for Galois field multiplication in digital hardware as compared to conventional multiplications exceed fifty percent (50%). Algorithms for effecting the Galois field multiplication operation are well known to those skilled in the art, and therefore will not be described herein. In general, the multiplication result in a Galois field may be obtained more efficiently since only partial information of the intermediate arithmetic steps is required to determine the unique output value.

It should further be noted that combining two (2) numbers via Galois field multiplication results in the masking of the two (2) numbers whenever there is no knowledge of the same. This property is desirable in numerous communications system applications. This property is also comparable to combination techniques that combine two (2) numbers through a bit-wise XOR (exclusive or) logical operation except that each digit in the individual input sequence values has a larger effect on the other digits in the output value. The bit-wise XOR logical operation can be viewed as a special case of Galois extension field multiplication for a Galois field $GF[2^1]$, where a number maps to its own multiplicative inverse in the Galois extension field $GF[2^2]$.

Figure 2:
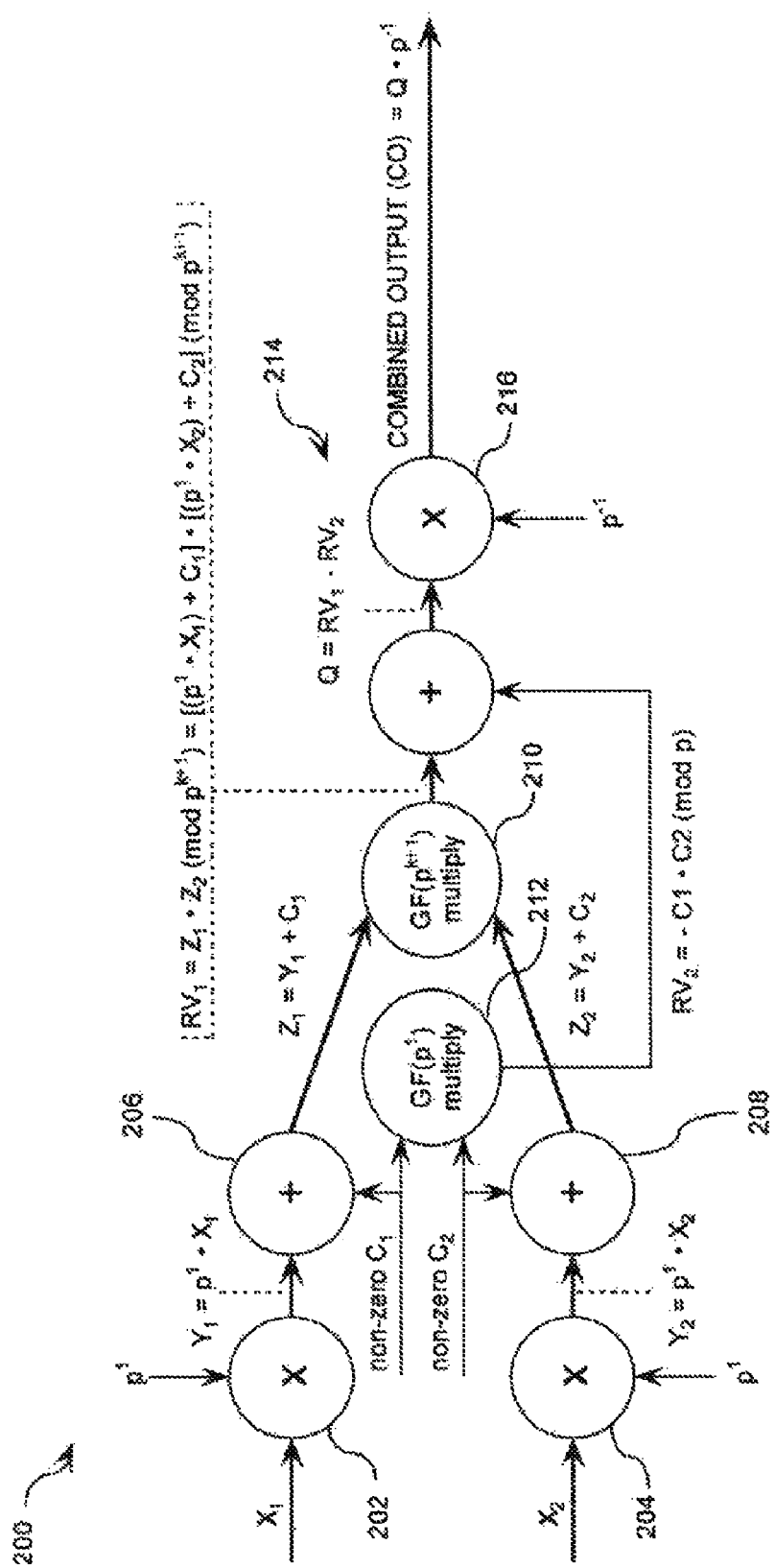
FIG. 2 is a diagram of a CGFC arithmetic process that is useful for understanding the invention.

Referring now to FIG. 2, the above described CGFC method 100 can be further defined by a CGFC arithmetic process 200. The CGFC arithmetic process 200 begins with data inputs $X_1$ and $X_2$. The data input $X_1$ can be payload data or a random number of a random number sequence. The data input $X_2$ can be a pseudo-random number of a pseudo-random number sequence or a pseudo-chaotic random number of a pseudo-chaotic random number sequence. The phrase "payload data" as used herein refers to data that is a numerical equivalent of a written symbol of a natural language, such as a letter or a punctuation mark. For example, if a number three (3) is an numerical equivalent to a letter C, then the data input $X_1$ has a value of three (3). The data input can also be the numerical equivalent for data of any type using a predefined coding process.

The data inputs $X_1$, $X_2$ are expressed as a member of the Galois field $GF[p^k]$ of dimension $p^k$. $p^k$ is a prime number defining a finite field size of the Galois field $GF[p^k]$. According to an embodiment of the invention, the data inputs $X_1$, $X_2$ are expressed in a Galois field with a power of two (2) dimension, i.e., a Galois field $GF[2^k]$ representation. In such a scenario, the manipulation of elements of the Galois field $GF[2^k]$ in binary arithmetic is trivial.

The data inputs $X_1$, $X_2$ are expressed in a p-adic number system representation or a mixed-radix number system representation. The p-adic number system and the mixed-radix number system are well known to persons skilled in the art, and therefore will not be described in great detail herein. However, it should be appreciated that a p-adic number is an element of an extension of the field of natural numbers based on the divisibility of integers by a given relatively prime number p. The phrase "natural number" as used herein refers to the set of positive integers greater than zero (0). In practice p is greater then and equal to two ($p \geq 2$) since the value of p equal to one (p=1) contains no information. The extension of the field of natural numbers results in a p-adic number sequence. The p-adic number sequence is comprised of k elements $(x_0, x_1, \ldots, x_{k-1})$ of residue $x_k$ modulo p.

As shown in FIG. 2, the initial multiplication operations 202, 204 and addition operations 206, 208 are performed using the data inputs $X_1$, $X_2$. These operations 202, 204, 206, 208 are performed to increase a size of the finite or Galois field $GF[p^k]$ from $p^k$ to $p^{k+1}$ via an Affine transformation. p is taken to be an arbitrary prime number. Still, the invention is not limited in this regard. For example, p can be extended to composite numbers through processes like the Chinese Remainder Theorem. The products of the multiplication operations 202, 204 are herein after referred to as $Y_1$ and $Y_2$. The products $Y_1$, $Y_2$ are defined by mathematical Equations (1-2).

$$Y_1 = X_1 \cdot p^1 \tag{1}$$

$$Y_2 = X_2 \cdot p^1 \tag{2}$$

where $Y_1$ and $Y_2$ are products obtained via a multiplication operation 202, 204.

Subsequently, the addition operations 206, 208 are performed to add a non-zero constant $C_1$, $C_2$ from a finite or Galois field $GF[p^1]$ to each product $Y_1$, $Y_2$. The non-zero constants $C_1$, $C_2$ have a value of 1, 2, . . . , or p−1. These addition operations 206, 208 complete the input Affine transformations and assure the existence of inverses of the data inputs $X_1$, $X_2$. It should be appreciated that if p=2 and the arithmetic operations 206, 208 are performed in binary arithmetic then the Affine transformation is a simple appending of a binary one (1) to the right of a least significant bit (LSB) of the data input $X_1$, $X_2$ thus implementing 2X+1 as one (1) is the only nonzero element in a Galois field GF[2].

The results of the addition operations 206, 208 are hereinafter referred to as $Z_1$ and $Z_2$. The results $Z_1$, $Z_2$ are defined by mathematical Equations (3-4).

$$Z_1 = Y_1 + C_1 = (X_1 \cdot p^1) + C_1 \qquad (3)$$

$$Z_2 = Y_2 + C_2 = (X_2 \cdot p^1) + C_2 \qquad (4)$$

where $Z_1$ and $Z_2$ are results of addition operations. $Y_1$ and $Y_2$ are products obtained via multiplication operations 202, 204. $C_1$ and $C_2$ are nonzero constants selected from a finite or Galois field GF[p]. $X_1$ and $X_2$ are data inputs expressed as RNS residue values, p-adic number system representations, or mixed-radix number system representations. p is a prime number constant defining a finite field size of a Galois field GF[p].

Thereafter, a Galois field multiplication 210 is performed using the results $Z_1$, $Z_2$. This Galois field multiplication 210 is performed to combine the data inputs $X_1$, $X_2$ in an expanded Galois field GF[$p^{k+1}$]. The result of the Galois field multiplication 210 is defined by mathematical Equation (5).

$$RV_1 = Z_1 \cdot Z_2 (\bmod\, p^{k+1}) = [(X_1 \cdot p^1) + C_1] \cdot [(X_2 \cdot p^1) + C_2] \\ (\bmod\, p^{k+1}) \qquad (5)$$

where $RV_1$ is a result of the Galois field multiplication 210. $p^{k+1}$ is a modulus having a value defined by the size of the extended Galois field GF[$p^{k+1}$]. If should be understood that when two elements from a Galois field GF[$p^{k+1}$] are multiplied the product is another element within that Galois field GF[$p^{k+1}$]. In effect, a finite structure size is maintained while a multiplication operation is being performed using the results $Z_1$, $Z_2$. For example, if $p^{k+1}$ is selected to have a value of sixteen (16) and the product $Z_1 \cdot Z_2$ results in a value of forty-five (45), then the result of the arithmetic operation forty-five modulo sixteen (45 modulo 16) equals thirteen (13). The value thirteen (13) is an element in the finitely many invertible elements $\{1, 3, \ldots, 15\}$ of the Galois extension field GF[16].

As shown in FIG. 2, the nonzero constants $C_1$, $C_2$ are combined together via Galois field multiplication 212. This Galois field GF[$p^1$] multiplication 212 is performed to combine the nonzero constants $C_1$, $C_2$ in Galois field GF[$p^1$]. The result of the Galois field multiplication 212 can be defined by mathematical Equation (6).

$$RV_2 = -C_1 \cdot C_2 (\bmod\, p) \qquad (6)$$

where $RV_2$ is a value representing the nonzero constants $C_1$, $C_2$. p is a modulus having a prime number value defining a finite field size of a Galois field GF[$p^1$]. In the case of p equal to one (p=1) and $C_1$ times $C_2$ equals one ($C_1 = C_1 = C_1 \cdot C_2 = 1$), there is no need to perform this multiplication 212 in a Galois extension field since multiplicative inverses will always exist for both data inputs $X_1$, $X_2$.

As shown in FIG. 2, $(RV_1 - RV_2) \cdot p^{-1}$ is computed to perform an Affine transformation 214 from a Galois field GF[$p^{k+1}$] to a Galois field GF[$p^k$]. The Affine transformation 214 includes subtracting $RV_2$ from $RV_1$ to obtain a result Q. The result Q can be defined by a mathematical Equation (7).

$$Q = RV_1 - RV_2 \qquad (7)$$

Thereafter, the product Q is combined with a multiplicative inverse of $p^1$ via a multiplication operation 216 to obtain a combined output (CO). The combined output can be defined by mathematical Equation (8).

$$CO = Q \cdot p^{-1} \qquad (8)$$

where Q is a result obtained from subtracting $RV_2$ from $RV_1$. $p^{-1}$ is the multiplicative inverse of the prime p.

The overall CGFC arithmetic process 200 can be generally defined by a mathematical Equation (9).

$$CO = \frac{\left[(p \cdot X_1 + C_1) \cdot (p \cdot X_2 + C_2)(\bmod\, p^{k+1}) - C_1 \cdot C_2 (\bmod\, p)\right]}{p} \qquad (9)$$

where p is a prime number constant defining a finite field size of a Galois field GF[$p^m$]. $X_1$ and $X_2$ are data inputs expressed as values in a p-adic number system representation or a mixed-radix number system representation. $C_1$ and $C_2$ are nonzero values selected from a Galois field GF[p]. $p^{k+1}$ is a number value defining a finite field size of a Galois field GF[$p^{k+1}$]. It should be noted that for p equal to two (p=2) all products in the extended Galois field GF[$p^{k+1}$] are odd. Therefore, the operation defined in mathematical Equation (8) can be performed simply in binary arithmetic by truncating the k=1 bit result of the modulo multiply $RV_1$ to the k most significant bits (MSBs). More generally, the least significant bit (LSB) is removed from the result of subtracting $RV_2$ from $RV_1$.

Referring again to FIG. 2, a method of extending the repetition period of a random number sequence can be easily constructed. Given two (2) random number sequences as inputs $X_1$ and $X_2$ that come from pseudo-random number generators with mutually prime repetition periods, the output numerical sequence will be a nonlinear combination that yields another pseudo-random number sequence with a repetition period equal to the product of the input repetition periods. The method described in this paragraph extends trivially to the combination of larger numbers of random number generators since multiplication inside a Galois field is associative. In this context, the "associative" property refers to the ability to reorder inputs to an arithmetic process in any combination, resulting in the same output. Note that the CGFC arithmetic process 200 (described above in relation to FIG. 2) as a whole is associative.

It should be understood that the CGFC arithmetic process 200 can be modified in accordance with an encoding process, in such a scenario, the data input $X_1$ can be a number from a numerical sequence representing data. $X_2$ can be a number from a coding sequence. The coding sequence can be, but is not limited to, a pseudo-random number sequence or a pseudo-chaotic random number sequence. An example of such a modified CGFC arithmetic process 200 is provided in FIG. 3.

Figure 3:
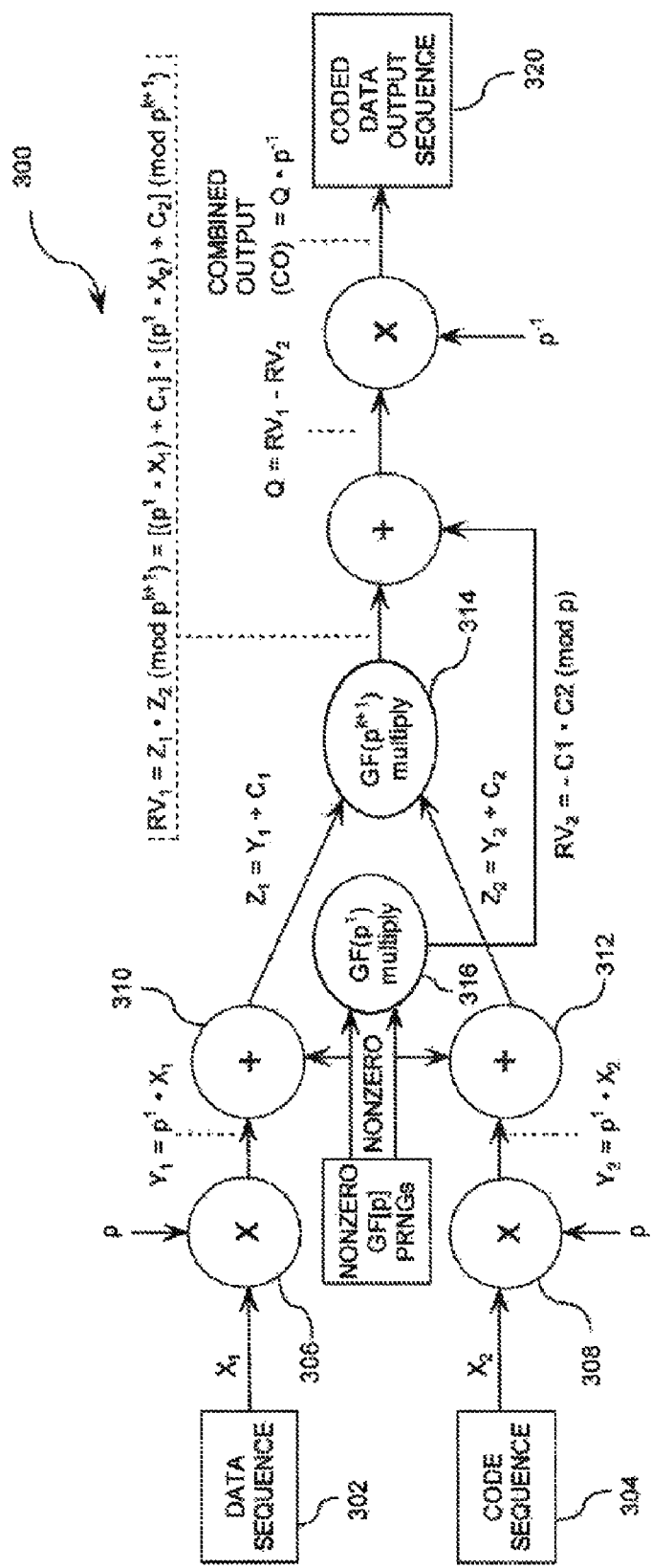
FIG. 3 is a diagram of a CGFC arithmetic process for encoding data that is useful for understanding the invention.

Referring now to FIG. 3, a block diagram of a CGFC arithmetic process 300 for encoding data is provided. It should be understood that the CGFC arithmetic process 300 may be used in conjunction with other processes to create stream ciphers or other coding algorithms. Such structures include, but are not limited to, feedback loops, scrambling, and mixed-radix operations.

As shown in FIG. 3, each value of a data sequence 302 is combined with a value of a code sequence 304 through a Galois extension field multiplication 314 (described above in relation to FIG. 1 and FIG. 2). It should be noted that the data sequence 302 and/or the code sequence 304 can be selected to have a known mathematical relationship. The data sequence 302 and the code sequence 304 can also be comprised of two or more digits expressed in a weighted number system. In such a scenario, the data sequence 302 and the code sequence 304 can be combined by selectively performing a Galois extension field multiplication 314 using a distinct subset of digits from each sequence 302, 304.

It should be noted that the dynamic range of the code sequence 304 values is assumed to be greater than or equal to that of the data sequence 302 values. As used herein, the phrase "dynamic range" refers to the number of possible values for a number or a measurement. The dynamic range is equivalent to a cardinality of a set of possible input values.

It should also be noted that the code sequence 304 may be formed from a truncated or random selection of values generated by one or more random number generators. Random number generators are well known to persons skilled in the art, and therefore will not be described in great detail herein. The coded data output sequence 320 of the encoding process 300 represents a block of encoding or encryption cipher on the data sequence 302 values using the coded sequence 304 values.

It should further be noted that a nearly symmetric method for decoding the coded data output sequence 320 exists. A decoding process can be performed to obtain the data sequence 302 from the combined output coded data sequence 320. Such an inverse CGFC arithmetic process is described below in FIG. 4.

Figure 4:
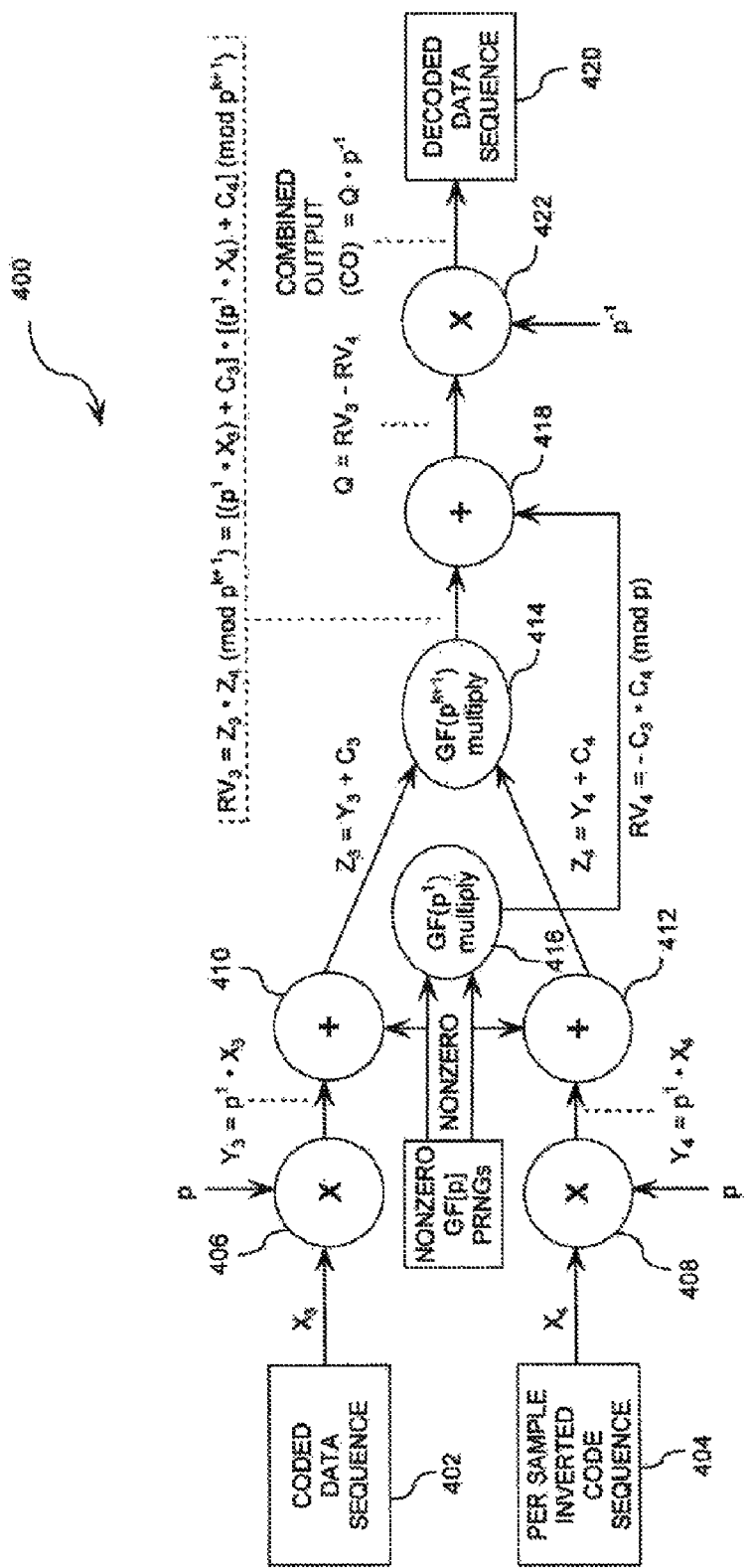
FIG. 4 is a diagram of a CGFC arithmetic process for decoding data that is useful for understanding the invention.

Referring now to FIG. 4, a first input sequence 402 is the coded data output sequence 320 developed in the encoding process 300 (described above in relation to FIG. 3). A second input sequence 404 is an inverted code sequence based on the code sequence 304 utilized in the encoding process 300. The "inverse" operation on this code sequence 304 refers to an infective mapping from the original code sequence 304 values that represent the unique multiplicative inverse of the code sequence 304 values inside the same Galois extension field that is used for the combination step. This inverse operation is calculated on a value by value basis. The inverse operation may be implemented using any combination of arithmetic processes, digital logic, lookup tables, or software. Efficient methods to locate a multiplicative inverse inside residue number systems are well known to those skilled in the art, and therefore will not be described in great detail herein. However, it should be noted that one common method for determining the multiplicative inverse inside a Galois field is via an Extended Euclidean algorithm. The Extended Euclidean algorithm is well known to persons skilled in the art, and will not be described in detail herein.

Given the inverted code sequence 404, the decoding process 400 follows the identical combination technique of the CGFC arithmetic process 200 (described above in relation to FIG. 2). In this regard, it should be appreciated that the decoding process 400 includes multiplications operations 408, 408 and addition operations 410, 412. The decoding process 400 also includes a Galois extension field multiplication operation 414 and a Galois field multiplication operation 416. The decoding process further includes an addition operation 418 and a multiplication operation 422. The output sequence 420 of the decoding process 400 is identical to original data sequence 302 of FIG. 3.

Table 3 presents all of the encoded and decoded values possible from the data and code sequences if the Galois field GF[8] follows the flows shown in FIG. 3 and FIG. 4. It should be appreciated that the table heading "Data Sequence from a First Data Source" refers to values of the Data Sequence 302 of FIG. 3. The table heading "Code Sequence from a Second Data Source" refers to values of the Code Sequence 304 of FIG. 3. The table heading "First Data Source Affine Transformation" refers to the value of $Z_1$ produced by the multiplication and addition operations 306, 310 of FIG. 3. The table heading "Second Data Source Affine Transformation" refers to the value of $Z_2$ produced by the multiplication and addition operations 308, 312 of FIG. 3. The table heading "GF[16] Result" refers to the intermediate result $RV_1$ of FIG. 3. The table heading "GF[8] Result" refers to the intermediate result CO of FIG. 3. The table heading "1/Data Source 2 in GF[16]" refers to the intermediate result $Z_4$ of FIG. 4. The table heading "GF[8] Decoded Data" refers to the decoded data sequence 420 of FIG. 4. It should be noted that in this binary (p=2) example, the arbitrary nonzero value that is appended to each of the values is always one (1). It should also be noted that the decoding step requires multiplication by the multiplicative inverse of the random sequence rather than the sequence value itself.

TABLE 3

| Data Sequence from a First Data Source | Code Sequence from a Second Data Source | First Data Source Affine Trans. | Second Data Source Affine Trans. | GF[16] Result | GF[8] Result | 1/Data Source 2 in GF[16] | GF[8] Decoded Data |
|---|---|---|---|---|---|---|---|
| 0 | 0 | 1 | 1 | 1 | 0 | 1 | 0 |
| 0 | 1 | 1 | 3 | 3 | 1 | 11 | 0 |
| 0 | 2 | 1 | 5 | 5 | 2 | 13 | 0 |
| 0 | 3 | 1 | 7 | 7 | 3 | 7 | 0 |
| 0 | 4 | 1 | 9 | 9 | 4 | 9 | 0 |
| 0 | 5 | 1 | 11 | 11 | 5 | 3 | 0 |
| 0 | 6 | 1 | 13 | 13 | 6 | 5 | 0 |
| 0 | 7 | 1 | 15 | 15 | 7 | 15 | 0 |
| 1 | 0 | 3 | 1 | 3 | 1 | 1 | 1 |
| 1 | 1 | 3 | 3 | 9 | 4 | 11 | 1 |
| 1 | 2 | 3 | 5 | 15 | 7 | 13 | 1 |
| 1 | 3 | 3 | 7 | 5 | 2 | 7 | 1 |
| 1 | 4 | 3 | 9 | 11 | 5 | 9 | 1 |
| 1 | 5 | 3 | 11 | 1 | 0 | 3 | 1 |
| 1 | 6 | 3 | 13 | 7 | 3 | 5 | 1 |
| 1 | 7 | 3 | 15 | 13 | 6 | 15 | 1 |
| 2 | 0 | 5 | 1 | 5 | 2 | 1 | 2 |
| 2 | 1 | 5 | 3 | 15 | 7 | 11 | 2 |
| 2 | 2 | 5 | 5 | 9 | 4 | 13 | 2 |
| 2 | 3 | 5 | 7 | 3 | 1 | 7 | 2 |
| 2 | 4 | 5 | 9 | 13 | 6 | 9 | 2 |
| 2 | 5 | 5 | 11 | 7 | 3 | 3 | 2 |
| 2 | 6 | 5 | 13 | 1 | 0 | 5 | 2 |
| 2 | 7 | 5 | 15 | 11 | 5 | 15 | 2 |

TABLE 3-continued

| Data Sequence from a First Data Source | Code Sequence from a Second Data Source | First Data Source Affine Trans. | Second Data Source Affine Trans. | GF[16] Result | GF[8] Result | 1/Data Source 2 in GF[16] | GF[8] Decoded Data |
|---|---|---|---|---|---|---|---|
| 3 | 0 | 7 | 1 | 7 | 3 | 1 | 3 |
| 3 | 1 | 7 | 3 | 5 | 2 | 11 | 3 |
| 3 | 2 | 7 | 5 | 3 | 1 | 13 | 3 |
| 3 | 3 | 7 | 7 | 1 | 0 | 7 | 3 |
| 3 | 4 | 7 | 9 | 15 | 7 | 9 | 3 |
| 3 | 5 | 7 | 11 | 13 | 6 | 3 | 3 |
| 3 | 6 | 7 | 13 | 11 | 5 | 5 | 3 |
| 3 | 7 | 7 | 15 | 9 | 4 | 15 | 3 |
| 4 | 0 | 9 | 1 | 9 | 4 | 1 | 4 |
| 4 | 1 | 9 | 3 | 11 | 5 | 11 | 4 |
| 4 | 2 | 9 | 5 | 13 | 6 | 13 | 4 |
| 4 | 3 | 9 | 7 | 15 | 7 | 7 | 4 |
| 4 | 4 | 9 | 9 | 1 | 0 | 9 | 4 |
| 4 | 5 | 9 | 11 | 3 | 1 | 3 | 4 |
| 4 | 6 | 9 | 13 | 5 | 2 | 5 | 4 |
| 4 | 7 | 9 | 15 | 7 | 3 | 15 | 4 |
| 5 | 0 | 11 | 1 | 11 | 5 | 1 | 5 |
| 5 | 1 | 11 | 3 | 1 | 0 | 11 | 5 |
| 5 | 2 | 11 | 5 | 7 | 3 | 13 | 5 |
| 5 | 3 | 11 | 7 | 13 | 6 | 7 | 5 |
| 5 | 4 | 11 | 9 | 3 | 1 | 9 | 5 |
| 5 | 5 | 11 | 11 | 9 | 4 | 3 | 5 |
| 5 | 6 | 11 | 13 | 15 | 7 | 5 | 5 |
| 5 | 7 | 11 | 15 | 5 | 2 | 15 | 5 |
| 6 | 0 | 13 | 1 | 13 | 6 | 1 | 6 |
| 6 | 1 | 13 | 3 | 7 | 3 | 11 | 6 |
| 6 | 2 | 13 | 5 | 1 | 0 | 13 | 6 |
| 6 | 3 | 13 | 7 | 11 | 5 | 7 | 6 |
| 6 | 4 | 13 | 9 | 5 | 2 | 9 | 6 |
| 6 | 5 | 13 | 11 | 15 | 7 | 3 | 6 |
| 6 | 6 | 13 | 13 | 9 | 4 | 5 | 6 |
| 6 | 7 | 13 | 15 | 3 | 1 | 15 | 6 |
| 7 | 0 | 15 | 1 | 15 | 7 | 1 | 7 |
| 7 | 1 | 15 | 3 | 13 | 6 | 11 | 7 |
| 7 | 2 | 15 | 5 | 11 | 5 | 13 | 7 |
| 7 | 3 | 15 | 7 | 9 | 4 | 7 | 7 |
| 7 | 4 | 15 | 9 | 7 | 3 | 9 | 7 |
| 7 | 5 | 15 | 11 | 5 | 2 | 3 | 7 |
| 7 | 6 | 15 | 13 | 3 | 1 | 5 | 7 |
| 7 | 7 | 15 | 15 | 1 | 0 | 15 | 7 |

Closed Galois Field Cryptographic System

It should be understood that conventional cryptographic systems typically require an asymmetric encryption or decryption processing technique implemented in digital hardware. The phrase "asymmetric processing" as used herein refers to a significant difference in time, processing structure, or computational resources required to perform associated operations. This asymmetric encryption or decryption processing technique can limit many ciphers functionality and applicability. For example, an RSA algorithm involves selecting public and private keys for encrypting data. This selection typically makes decrypting a message by an intended user far easier than an encryption step by a messenger. The digital hardware typically includes a relatively large number of digital logic gates. As such, the conventional cryptographic systems have a relatively high power consumption and relatively long data processing time. Encryption methods that permit symmetric processing permit design re-use of hardware as well as more flexibility in function and applicability.

Embodiments of a closed Galois field (CGF) cryptographic system (e.g., shown in FIG. 5) provides a symmetric encryption and decryption processing technique implemented in digital hardware. The phrase "symmetric processing" as used herein refers to an ability to both encrypt and decrypt a message using a significantly similar processing structure, time, and resources. In effect, the embodiment of the CGF cryptographic system has a relatively short data processing time as compared to conventional cryptographic systems. The embodiments of the CGF cryptographic system also have a relatively low power consumption as compared to conventional cryptographic systems due to the efficient combination means.

Figure 5:
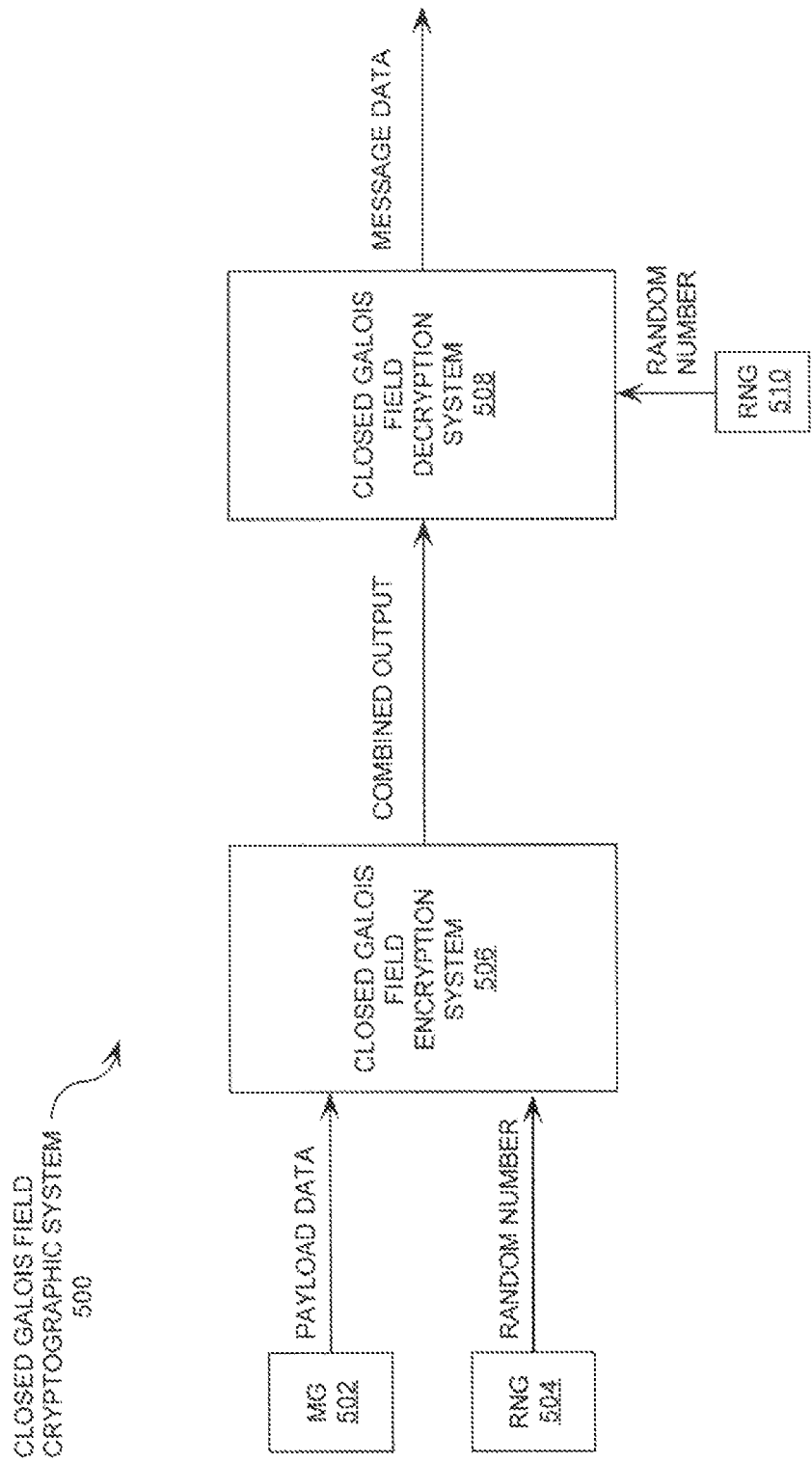
FIG. 5 is a block diagram of a closed Galois field cryptographic system that is useful for understanding the invention.

Referring now to FIG. 5, there is illustrated one embodiment of a closed Galois field (CGF) cryptographic system 500 which could be used to implement the inventive arrangements. The CGF cryptographic system 500 is comprised of a message generator 502 and random number generators (RNGs) 504, 510. The CGF cryptographic system 500 is also comprised of a closed Galois field (CGF) encryption system 508 and a closed Galois field (CGF) decryption system 508. The message generator 502 is comprised of hardware and software configured to generate payload data. The message generator 502 is also comprised of hardware and software configured to perform operations for expressing payload data in a block format. The message generator 502 is further comprised of hardware and software configured to communicate payload data to the CGF encryption system 506.

The RNG 504 is comprised of hardware and software configured to generate an encryption sequence. The encryption sequence can be comprised of linearly or nonlinearly generated pseudo-random numbers or pseudo-chaotic random numbers. The RNG 504 is also comprised of hardware and software configured to communicate a random number sequence to the CGF encryption system 506.

The CGF encryption system 506 is comprised of hardware and software configured to receive payload data from the message generator 502 and an encryption sequence from the RNG 504. The CGF encryption system 506 is also comprised of hardware and software configured to implement and perform a CGFC method 100 (described above in relation to FIG. 1) and a CGFC arithmetic process 300 (described above in relation to FIG. 3) for encrypting payload data using the random number sequence. The CGF encryption system 506 is further comprised of hardware and software configured to communicate a combined output to the CGF decryption system 508.

The RNG 510 is comprised of hardware and software configured to generate a decryption sequence. The decryption sequence can be comprised of linearly or nonlinearly generated pseudo-random numbers or pseudo-chaotic random numbers. The decryption sequence can be the same as the encryption sequence generated by the RNG 504. The RNG 510 is also comprised of hardware and software configured to perform data block formatting. The RNG 510 is further comprised of hardware and software configured to communicate a decryption sequence to the CGF decryption system 508.

The CGF decryption system 508 is comprised of hardware and software configured to receive a combined output from the CGF encryption system 506 and a decryption sequence from the RNG 610. The CGF decryption system 508 is also comprised of hardware and software configured to implement and perform an inverse CGFC arithmetic process 400 (described above in relation to FIG. 4) for decrypting payload data. The CGF decryption system 508 is further comprised of hardware and software configured to communicate message data to an external device (not shown).

In light of the foregoing description of the invention, it should be recognized that the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or an FPGA could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Additionally, the description above is intended by way of example only and is not intended to limit the present invention in any way, except as set forth in the following claims.

The invention described and claimed herein is not to be limited in scope by the preferred embodiments herein disclosed, since these embodiments are intended as illustrations of several aspects of the invention. Any equivalent embodiments are intended to be within the scope of this invention.

Indeed, various modifications of the invention in addition to those shown and described herein will become apparent to those skilled in the art from the foregoing description. Such modifications are also intended to fall within the scope of the appended claims.

We claim:

1. A method for combining at least two input sequences in a communications system to increase a repetition period of the at least two input sequences in a resource efficient manner, comprising:

receiving, by an electronic circuit, a first number sequence and a second number sequence, each expressed in a Galois field $GF[p^k]$;

mapping, by said electronic circuit, said first number sequence and said second number sequence to a Galois extension field $GF[p^{k+1}]$; and generating, by said electronic circuit, an output sequence by combining said first number sequence with said second number sequence utilizing a Galois field multiplication operation in said Galois extension field $GF[p^{k+1}]$, where p is a prime number, k is an integer value, and $p^{k+1}$ defines a finite field size of said Galois extension field $GF[p^{k+1}]$.

2. The method according to claim 1, wherein $p^k$ is selected to be a prime number defining a finite field size of said Galois field $GF[p^k]$.

3. The method according to claim 1, further comprising expressing, by said electronic circuit, said first number sequence and said second number sequence in a p-adic number system representation prior to said receiving step.

4. The method according to claim 1, further comprising expressing, by said electronic circuit, said first number sequence and said second number sequence in a mixed-radix number system representation prior to said receiving step.

5. The method according to claim 1, wherein each of said first number sequence and said second number sequence are selected to be comprised of at least two digits expressed in a weighted number system.

6. The method according to claim 1, wherein said generating step further comprises combining said first number sequence and said second number sequence by selectively performing a plurality of Galois field multiplication operations using a distinct, subset of digits from each of said first number sequence and said second number sequence.

7. The method according to claim 1, wherein said first number sequence is selected to be payload data or a random number sequence.

8. The method according to claim 1, wherein said second number sequence is selected to be a pseudo random number sequence or a pseudo-chaotic random number sequence.

9. The method according to claim 1, wherein a plurality of input sequences are selected to be random number sequences having a known mathematical relationship and wherein said plurality of input sequences are combined with said first number sequence.

10. The method according to claim 1, wherein said mapping step further comprises performing an Affine transformation of said first number sequence and said second number sequence.

11. The method according to claim 10, wherein said Affine transformation is selected to be a function of time.

12. A closed Galois field cryptographic (CGFC) system, comprising:

at least one electronic circuit configured to:

receive a first number sequence and a second number sequence, each expressed in a Galois field $GF[p^k]$;

map said first number sequence and said second number sequence to a Galois extension field $GF[p^{k+1}]$; and generate an output sequence by combining said first number sequence with said second number sequence utilizing a Galois field multiplication operation in said Galois extension field $GF[p^{k+1}]$, where p is a prime number, k is an integer value, and $p^{k+1}$ defines a finite field size of said Galois extension field $GF[p^{k+1}]$.

13. The CGFC system according to claim 12, wherein $p^k$ is selected to be a prime number defining a finite field size of a Galois field $GF[p^k]$.

14. The CGFC system according to claim 12, wherein said first number sequence and said second number sequence are expressed in a p-adic number system representation or a mixed-radix number system representation.

15. The CGFC system according to claim 12, wherein each of said first number sequence and said second number sequence are selected to be comprised of at least two digits expressed in a weighted number system.

16. The CGFC system according to claim 12, wherein said electronic circuit is further configured to combine said first number sequence and said second number sequence by selectively performing a plurality of Galois field multiplication operations using distinct subset of digits from each of said first number sequence and said second number sequence.

17. The CGFC system according to claim 12, wherein said first number sequence is payload data or a random number sequence.

18. The CGFC system according to claim 12, wherein said second number sequence is a pseudo random number sequence or a pseudo-chaotic random number sequence.

19. The CGFC system according, to claim 12, wherein said electronic circuit is further configured to combine a plurality of input sequences with said first number sequence, wherein said plurality of input sequences are random number sequences having a known mathematical relationship.

20. The CGFC system according to claim 12, wherein said electronic circuit is further configured to perform an Affine transformation of said first number sequence and said second number sequence.

* * * * *